(12) United States Patent
Amsler

(10) Patent No.: US 9,392,003 B2
(45) Date of Patent: Jul. 12, 2016

(54) INTERNET SECURITY CYBER THREAT REPORTING SYSTEM AND METHOD

(71) Applicant: Raytheon Foreground Security, Inc., Heathrow, FL (US)

(72) Inventor: David B. Amsler, Heathrow, FL (US)

(73) Assignee: Raytheon Foreground Security, Inc., Heathrow, FL (US)

( * ) Notice: Subject to any disclaimer, the term of this patent is extended or adjusted under 35 U.S.C. 154(b) by 89 days.

(21) Appl. No.: 14/198,148

(22) Filed: Mar. 5, 2014

(65) Prior Publication Data

US 2014/0259170 A1    Sep. 11, 2014

Related U.S. Application Data

(63) Continuation-in-part of application No. 13/973,027, filed on Aug. 22, 2013, now Pat. No. 9,258,321.

(60) Provisional application No. 61/772,903, filed on Mar. 5, 2013.

(51) Int. Cl.
*H04L 29/06* (2006.01)

(52) U.S. Cl.
CPC ............ *H04L 63/1408* (2013.01); *H04L 63/20* (2013.01); *H04L 63/14* (2013.01); *H04L 63/1433* (2013.01); *H04L 63/1441* (2013.01)

(58) Field of Classification Search
CPC . H04L 63/14; H04L 63/1433; H04L 63/1441; H04L 63/20
USPC .................................................. 726/22, 23, 25
See application file for complete search history.

(56) References Cited

U.S. PATENT DOCUMENTS

| 5,991,881 | A  | 11/1999 | Conklin et al. |
| 6,154,844 | A  | 11/2000 | Touboul et al. |
| 6,301,668 | B1 | 10/2001 | Gleichauf et al. |

(Continued)

FOREIGN PATENT DOCUMENTS

| AU | 2011224687 B2 | 9/2011 |
| AU | 2012211490 A1 | 3/2013 |

(Continued)

OTHER PUBLICATIONS

"Automated Vulnerabiltiy Assessment That Streamlines Risk Assessment and Action"; McAfee Solution Brief; 2009.

(Continued)

*Primary Examiner* — Chau Le
*Assistant Examiner* — Gary Lavelle
(74) *Attorney, Agent, or Firm* — Schwegman Lundberg & Woessner, P.A.

(57) ABSTRACT

A risk assessment and managed security system for network users provides security services for dealing with formidable cyber threats, malware creations and phishing techniques. Automated solutions in combination with human-driven solutions establish an always-alert positioning for incident anticipation, mitigation, discovery and response. Assessments of threats are made and reported to a client system being monitored. The system provides an ability to receive in different file formats, and/or export from leading IT asset products asset lists for client enterprise computer systems and infrastructure, so that assets are linked to the client computer systems that are described in an incident that is being reported to the client.

24 Claims, 7 Drawing Sheets

(56) References Cited

U.S. PATENT DOCUMENTS

| | | | |
|---|---|---|---|
| 6,324,647 B1 * | 11/2001 | Bowman-Amuah | 726/23 |
| 6,519,703 B1 | 2/2003 | Joyce | |
| 7,278,162 B2 | 10/2007 | Lingafelt et al. | |
| 7,373,666 B2 | 5/2008 | Kaler et al. | |
| 7,415,728 B2 | 8/2008 | Morohashi et al. | |
| 7,418,733 B2 | 8/2008 | Connary et al. | |
| 7,451,489 B2 | 11/2008 | Cantrell et al. | |
| 7,454,499 B2 | 11/2008 | Cantrell et al. | |
| 7,454,792 B2 | 11/2008 | Cantrell et al. | |
| 7,463,590 B2 | 12/2008 | Mualem et al. | |
| 7,574,740 B1 | 8/2009 | Kennis | |
| 7,594,270 B2 | 9/2009 | Church et al. | |
| 7,647,637 B2 | 1/2010 | Schuba | |
| 7,707,637 B2 | 4/2010 | Kaler et al. | |
| 7,893,830 B2 | 2/2011 | Anand et al. | |
| 7,895,641 B2 | 2/2011 | Schneier et al. | |
| 7,930,256 B2 | 4/2011 | Gonsalves et al. | |
| 7,941,855 B2 | 5/2011 | Sung et al. | |
| 8,046,835 B2 | 10/2011 | Herz | |
| 8,079,080 B2 | 12/2011 | Borders | |
| 8,171,554 B2 | 5/2012 | Elovici et al. | |
| 8,180,886 B2 | 5/2012 | Overcash et al. | |
| 8,181,251 B2 | 5/2012 | Kennedy | |
| 8,255,996 B2 | 8/2012 | Elrod et al. | |
| 8,296,842 B2 | 10/2012 | Singh et al. | |
| 8,370,940 B2 | 2/2013 | Holloway et al. | |
| 8,402,540 B2 | 3/2013 | Kapoor et al. | |
| 8,407,335 B1 * | 3/2013 | Church et al. | 709/224 |
| 8,407,791 B2 | 3/2013 | Granstedt et al. | |
| 8,418,249 B1 | 4/2013 | Nucci et al. | |
| 8,424,091 B1 | 4/2013 | Su et al. | |
| 8,640,234 B2 | 1/2014 | Gassen et al. | |
| 8,739,287 B1 | 5/2014 | Polyakov et al. | |
| 8,805,839 B2 | 8/2014 | Fitzgerald et al. | |
| 8,881,278 B2 | 11/2014 | Kaplan et al. | |
| 9,021,590 B2 | 4/2015 | Herley et al. | |
| 2002/0078381 A1 | 6/2002 | Farley et al. | |
| 2002/0087882 A1 * | 7/2002 | Schneier et al. | 713/201 |
| 2003/0172145 A1 | 9/2003 | Nguyen | |
| 2004/0064731 A1 | 4/2004 | Nguyen et al. | |
| 2004/0088577 A1 | 5/2004 | Render | |
| 2004/0260947 A1 * | 12/2004 | Brady et al. | 713/201 |
| 2006/0064740 A1 | 3/2006 | Kelley et al. | |
| 2006/0212932 A1 * | 9/2006 | Patrick et al. | 726/11 |
| 2007/0076853 A1 | 4/2007 | Kurapati et al. | |
| 2007/0150949 A1 | 6/2007 | Futamura et al. | |
| 2008/0016569 A1 * | 1/2008 | Hammer et al. | 726/23 |
| 2008/0098476 A1 | 4/2008 | Syversen | |
| 2008/0184371 A1 | 7/2008 | Moskovitch et al. | |
| 2008/0307525 A1 | 12/2008 | Nickle | |
| 2009/0007145 A1 | 1/2009 | White et al. | |
| 2009/0070880 A1 | 3/2009 | Harris et al. | |
| 2010/0017870 A1 | 1/2010 | Kargupta | |
| 2010/0064039 A9 | 3/2010 | Ginter et al. | |
| 2010/0082513 A1 | 4/2010 | Liu | |
| 2010/0235915 A1 | 9/2010 | Memon et al. | |
| 2010/0251369 A1 | 9/2010 | Grant | |
| 2010/0325731 A1 | 12/2010 | Evrard | |
| 2011/0010633 A1 | 1/2011 | Richmond et al. | |
| 2011/0019574 A1 | 1/2011 | Malomsoky et al. | |
| 2011/0023115 A1 | 1/2011 | Wright | |
| 2011/0023118 A1 | 1/2011 | Wright | |
| 2011/0131163 A1 | 6/2011 | Stern et al. | |
| 2011/0138471 A1 | 6/2011 | Van De et al. | |
| 2011/0184877 A1 | 7/2011 | Mchugh et al. | |
| 2011/0219445 A1 | 9/2011 | Merwe et al. | |
| 2011/0239303 A1 * | 9/2011 | Owens, Jr. | 726/25 |
| 2011/0282997 A1 | 11/2011 | Prince et al. | |
| 2011/0283359 A1 | 11/2011 | Prince et al. | |
| 2012/0022942 A1 | 1/2012 | Holloway et al. | |
| 2012/0023090 A1 | 1/2012 | Holloway et al. | |
| 2012/0023572 A1 | 1/2012 | Williams, Jr. et al. | |
| 2012/0069978 A1 * | 3/2012 | Evans et al. | 379/112.06 |
| 2012/0096558 A1 | 4/2012 | Evrard | |
| 2012/0102570 A1 | 4/2012 | Herz | |
| 2012/0116896 A1 | 5/2012 | Holloway et al. | |
| 2012/0117222 A1 | 5/2012 | Holloway et al. | |
| 2012/0117239 A1 | 5/2012 | Holloway et al. | |
| 2012/0117267 A1 | 5/2012 | Holloway et al. | |
| 2012/0117458 A1 | 5/2012 | Holloway et al. | |
| 2012/0117649 A1 | 5/2012 | Holloway et al. | |
| 2012/0246727 A1 | 9/2012 | Elovici et al. | |
| 2012/0260337 A1 | 10/2012 | Merwe | |
| 2012/0323558 A1 | 12/2012 | Nolan et al. | |
| 2013/0055394 A1 | 2/2013 | Beresnevichiene et al. | |
| 2013/0055399 A1 | 2/2013 | Zaitsev | |
| 2013/0117848 A1 | 5/2013 | Golshan et al. | |
| 2013/0145466 A1 | 6/2013 | Richard et al. | |
| 2013/0254838 A1 | 9/2013 | Ahuja et al. | |
| 2013/0312097 A1 | 11/2013 | Turnbull | |
| 2013/0312101 A1 | 11/2013 | Lotem et al. | |
| 2014/0007238 A1 * | 1/2014 | Magee et al. | 726/24 |
| 2014/0020104 A1 | 1/2014 | Marinescu et al. | |
| 2014/0047546 A1 * | 2/2014 | Sidagni | 726/25 |
| 2014/0137257 A1 | 5/2014 | Martinez et al. | |
| 2014/0201836 A1 | 7/2014 | Amsler et al. | |
| 2015/0058985 A1 | 2/2015 | Sanchez et al. | |
| 2015/0096024 A1 | 4/2015 | Haq et al. | |
| 2015/0180896 A1 | 6/2015 | Higbee et al. | |
| 2015/0215285 A1 | 7/2015 | Fleury et al. | |

FOREIGN PATENT DOCUMENTS

| | | | |
|---|---|---|---|
| CA | 2351478 A1 | 5/2000 | |
| CA | 2430571 C | 6/2002 | |
| CA | 2434674 C | 7/2002 | |
| CA | 2509152 A1 | 7/2004 | |
| CA | 2706721 A1 | 6/2008 | |
| CA | 2801302 A1 | 12/2011 | |
| CA | 2747584 A | 11/2012 | |
| EP | 1090492 B1 | 8/2005 | |
| EP | 1749255 A1 | 2/2007 | |
| EP | 2106085 A1 | 9/2009 | |
| EP | 2112803 B1 | 12/2013 | |
| EP | 2808822 A1 | 12/2014 | |
| EP | 2863330 A1 | 4/2015 | |
| EP | 2882159 A1 | 6/2015 | |
| KR | 20080079767 A | 9/2008 | |
| KR | 20090090641 A | 8/2009 | |
| WO | 2004111785 A2 | 12/2004 | |
| WO | WO-2006008307 A1 | 1/2006 | |
| WO | 2010071625 A | 6/2010 | |
| WO | 2012034304 A | 3/2012 | |

OTHER PUBLICATIONS

Brugger; "Data Mining Methods for Network Intrusion Detection"; Univ. of CA; 2004.

David; Using Operational Risk Management (ORM) to Improve Computer Network Defense (CND) Performance in the Department of the Navy (DON); (DON)Postgrad School Thesis; Mar. 2001.

Dornseif et al.; "Vulnerability Assessment Using Honeypots"; KG Sauer Verlag, Muchen; 2004.

Fragkos; "Near Real-Time Threat Assessment using Intrusion Detection Systems's Data"; PhD Thesis; Glamorgan Univ., Wales; 2010.

Haslum; "Real-Time Network Intrusion Prevention"; Doctoral Thesis; NTNU; 2010.

Holsopple et al.; "TANDI; Threat Assessment of Network Data and Information"; Rochester Institute of Technology.

Lathrop et al.; "Modeling Network Attacks"; West Point Academy, NY.

Maybury et al.; "Analysis and Detection of Malicious Insiders"; International Conference on Intell. Analysis; 2005.

Mell; "Understanding Intrusion Detection Systems"; EDPACS, vol. XXIX, No. 5; 2001.

Quinlan; "Network Threat Discover Detection and Analysis on the Wire"; Norman Whitepaper, 2012.

Weihua et al.; "An Integrated Solution for Network Threat Detection and Automatic Reaction"; China Communications, 2006.

"U.S. Appl. No. 13/973,027, Non Final Office Action mailed Mar. 11, 2015", 17 pgs.

(56) References Cited

OTHER PUBLICATIONS

"U.S. Appl. No. 13/973,027, Notice of Allowance mailed Oct. 1, 2015", 7 pgs.

"U.S. Appl. No. 13/973,027, Response filed Feb. 19, 2015 to Restriction Requirement mailed Dec. 19, 2014", 10 pgs.

"U.S. Appl. No. 13/973,027, Response filed Sep. 8, 2015 to Non Final Office Action mailed Mar. 11, 2015", 12 pgs.

"U.S. Appl. No. 13/973,027, Restriction Requirement mailed Dec. 19, 2014", 8 pgs.

* cited by examiner

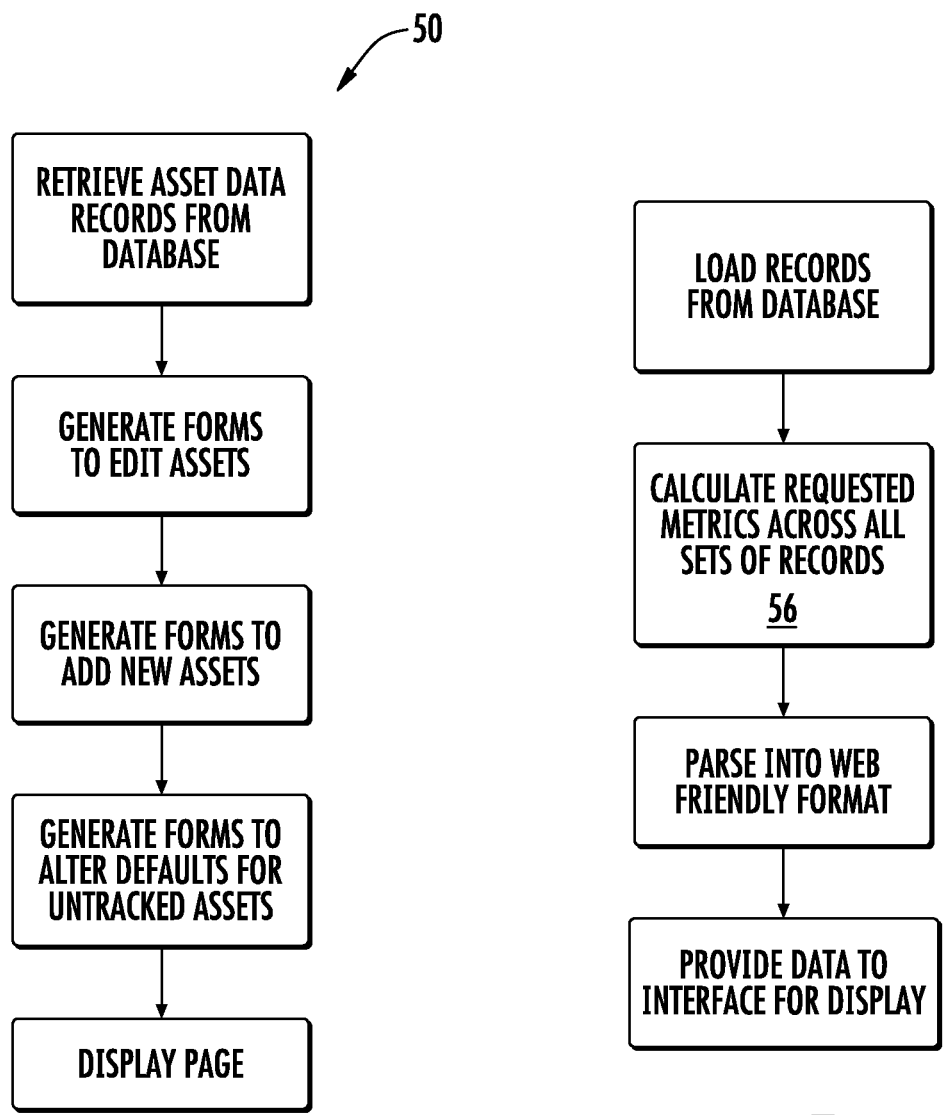

INTERNET SECURITY CYBER THREAT REPORTING SYSTEM AND METHOD

CROSS REFERENCE TO RELATED APPLICATION

This application is a Continuation-in-Part application claiming priority to U.S. Provisional Patent Application No. 61/772,903 filed on Mar. 5, 2013 for Internet Security Cyber Threat Reporting System and Method, and U.S. Utility patent application Ser. No. 13/973,027 for Automated Internet Threat Detection and Mitigation System and Associated Methods filed on Aug. 22, 2013, which itself claims priority to Provisional Patent Application Ser. No. 61/692,481 filed on Aug. 23, 2012 and Ser. No. 61/771,990 filed on Mar. 4, 2013, the disclosures of which are hereby incorporated by reference herein in its entirety, and all commonly owned.

FIELD OF THE INVENTION

The present invention generally relates to network security and in particular to an automated system and method for detecting, evaluating and reporting network threats.

BACKGROUND

The threat landscape has grown exponentially since the early 2000's, along with this landscape technology has continued to outpace itself, data has continued to grow, and the qualified people with the skillsets to sift through this data has shrunk. Computer security has become one of the largest markets in the technology field. It is becoming quintessential to everyday business, protection of intellectual property and to organizations, a way to stabilize the ever growing cyber arms race faced by nation states surrounding the economic empires of Americas, European, Russian, and Asia.

By way of example, there is a lack of ability and need to present security data to two major consumers of this type or category of data including analysts and customers. In current threat landscape, traditional portals that support security analysis or a customer base do not provide the comprehensive approach that is needed with the amount of data that is typically required to be presented in order for decisions to be made quickly, made by the right people, and made for the right reasons. These "security portals" typically do not have this comprehensive approach reflected to the customer in an easily readable, graphics intensive illustration that shows real-time threat data, the root cause analysis, metrics based on analysts assigned to monitor and security company assets, and the vulnerabilities associated with those assets.

SUMMARY

Embodiments of the present invention, including systems and methods, serve to increate automation, analysis, and reporting of analysis to customers through several functions, programs. Systems and methods according to the teachings of the present invention provide advancements in areas that traditional security reporting and operations portals do not provide.

Embodiments of the invention may provide Real-Time Labeling, Sorting, Ranking of Incidents, by way of example. One embodiment may comprise a threat intelligence product that feeds portal real-time incident information providing situation awareness of sorted, categorized/labeled and ranked for our analysts.

Metrics and Routing of Incident Information may be provided. By way of example. a threat intelligence system may include analyst profiles stored which have inputs about analyst capabilities, background, and the like, that allow intelligent decision making by an incident routing system so that incidents that arrive at an analyst's desk match not only a skill level, but familiarity with customer assets affected by the incident.

Pivoting to Security Devices may be provided. By way of example, a threat intelligence system may comprise built-in links and direct software calls to various brands of security devices that are presented to the analyst so that a simple "click" will allow them to "pivot" into security devices to investigate incidents alerted to them by our threat intelligence programs.

Common Analysis Processes may be provided. By way of example, a threat intelligence system may allow triage of alerted incidents through simultaneous editing and work flow on incidents with real-time chat, spell checking, customer checks to make sure tickets are for the customer intended, and war-room response to involve a full suite of analysis by using contextual searches on previous written tickets.

Believability and Reliability may be provided. By way of example, a system may include functionality that takes input from the analyst that is sent to a threat intelligence program in order to help with believability and reliability rankings of the incident alerts that our analysts see.

Scenario Based Ticket Creation may be provided. A system may provide an input form with various menus that allow an analyst to build an illustrated incident scenario such as type of attack, type of asset, time based analysis, and transaction base analysis that provides overview through graphical entity illustrations to the client.

Customizable Views may be provided. By way of example, a system may provide a module-based, customized view in which customers have over 30 different types of data views that can be displayed from parabolic graphics, 3D views of geo-locations, etc.

Link Analysis may be provided, wherein a system provides a robust illustration of incidents that characterize incidents in terms of entities, relationship based computer to computer transactions based on data flow analysis, exploit used, success rate, compromise rate, and ranking of the data stream used in the incident, by way of example.

Root Cause Analysis may be provided. By way of example, a system may provide insight into the root cause of the incident that was reported. The incident may be categorized based on analyzing the timeline and/or sequence of events, confirmation of an exploit and or attempted exploit of the computer system, and human analysis of the event.

Vulnerability Data Association may be provided. By way of example, a system may provide an interface and logical mapping of enterprise IT assets across incidents, ranking those assets per a level of criticality to business units and or business objectives of the customer. Vulnerability data may be paired with asset information and incident information in order to provide the customer with a holistic view of their security posture.

Asset Management may be provided. By way of example, a system may provide an ability to receive in different file formats, and/or export from leading IT Asset Products the asset lists for customer enterprise computer systems and infrastructure, so that assets are linked to the computer systems that are described in the incident that is being reported to the customer.

Metrics may be provided, wherein by way of example, a system is enriched with a program that drives calculations of metrics on the analyst's over a period of time, allowing customers to be served by not only the correct analyst for their business vertical, but serve to allow the customer insight into threat intelligence operations by systems and methods of the invention, and the talent that serves a contract between a provider of embodiments of the invention and the customer.

One method aspect of the invention may include a computer-implemented method for detecting and reporting an internet threat. The method may comprise collecting a plurality of cyber threat data for an incident from a plurality of threat intelligence sources; weighting the cyber threat data based on past performance by the threat intelligence source providing the data; sorting the cyber threat data by severity and reliability for providing indicators for the incident; connecting to a client system; monitoring incidents of the cyber threats on the client system; retrieving incidents detected on the client system; selecting at least one incident by an analyst; displaying known information about the at least one incident to the analyst; analyzing the incident by the analyst based on the indicators of the cyber threat data; transmitting an incident report to the client system by the analyst, wherein the incident report includes a recommended course of action and modification to the user system; closing the incident report; and updating a database with the closed incident report.

It will be understood by those of ordinary skill in the art that where reference is made to a system, an appropriate related method is applicable and supported by the present disclosure.

BRIEF DESCRIPTION OF THE DRAWINGS

Embodiments of the invention are described by way of example with reference to the accompanying drawings in which:

FIG. 6 is a flow chart illustrating an asset management functionality of the system, wherein surrounding data is organized and associated to assets in order to provide drill down features of link analysis of FIG. 5;

FIG. 7 is a flow chart illustrating a collection of metrics that help feed the decision-making processes involved in the routing engine referred to in FIG. 7.

DETAILED DESCRIPTION OF EMBODIMENTS

The present invention will now be described more fully hereinafter with reference to the accompanying drawings, in which embodiments of the invention are shown by way of illustration and example. This invention may, however, be embodied in many forms and should not be construed as limited to the embodiments set forth herein. Rather, these embodiments are provided so that this disclosure will be thorough and complete, and will fully convey the scope of the invention to those skilled in the art.

Figure 1:
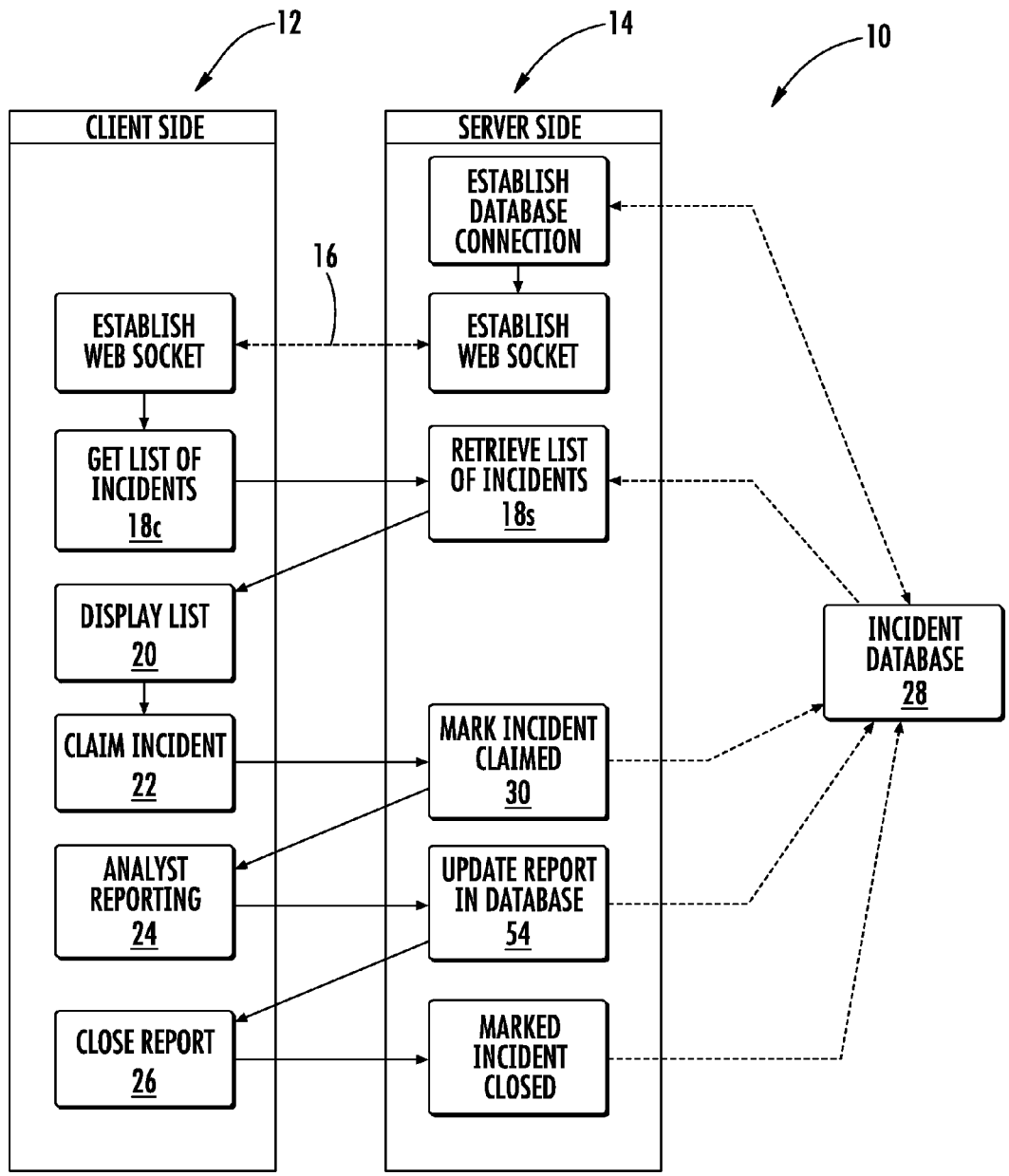
FIG. 1 is a block diagram illustrating one embodiment of the invention providing Analyst and Customer components.

With reference initially to FIG. 1, one system 10 and associated method according to the teachings of the present invention is herein described, by way of example, as comprising two large components that fall in the category of data display components, which are aptly named Analyst and Customer. These two data display functions are both supported by two components named client side 12 and server side 14.

The client side 12 is a set of procedural steps taken in the lifecycle of one incident report. A connection 16 to the server side 14 is opened. A list of incidents is retrieved 18 and displayed 20. An analyst selects an incident and all known information is displayed to the analyst. After an incident is claimed 22, reporting fields are displayed for customer and internal reporting made 24. When reporting 24 has finished, the analyst closes the incident 26 and an incident database 28 is updated with the closed report.

With continued reference to FIG. 1, the server side 14 is an event driven and input driven process which delivers client-side 12 requested information about the incidents. After receiving the request to open a connection to the client, the server side 14 retrieves a list of incidents from the incident database 28 and passes it to the client. Additional information is made available to the client for all incidents passed in the list. Further, the client has multiple features available as illustrated with reference to FIG. 3. When an incident is claimed, it is updated in the database and all clients are informed of the claim. Reports are stored in the database as the client fills them out, and when the report is marked as complete 30 in the database, and all clients are informed of the update.

The first component that makes up the client side 12 program is called, "Establish Connection." After authenticating, the socket connection 16 is established with the server side 14. Data are then synced across client and server sides 12, 14. Once all necessary items are set to sync and other objects used only by the client are instantiated, the client requests 18 the list of incidents from the server side 14.

After connecting to the server side 14, the client receives the list of incidents as an array of objects. Each item in the list represents one incident with several key fields meant to help an analyst quickly differentiate one incident from another. Each incident is parsed 34 into an HTML list 35 item and table row, given a class to help differentiate open incidents from claimed ones, and a click event handler is attached to each one. The list of incidents is then animated into the document for the analyst to interact with. When an incident is clicked, the client requests all additional information about the incident from the server.

In a claim incident, the data from the server-side 14 are returned as a dictionary of key value pairs. Each pair represents one field and its respective value about the incident. The pairs are parsed into table cells and displayed on the screen. If the incident had already been claimed by another analyst, no other options are made available beyond viewing the information about the incident as well as which analyst is handling it. If an analyst has not already claimed the incident, a claim button 37 is made visible. Clicking the button 37 sends the claim command to the server. The client then reinterprets the incident as being claimed by the analyst. When the incident is marked as claimed 30 by the analyst, the reporting process 24 becomes available.

Figure 2:
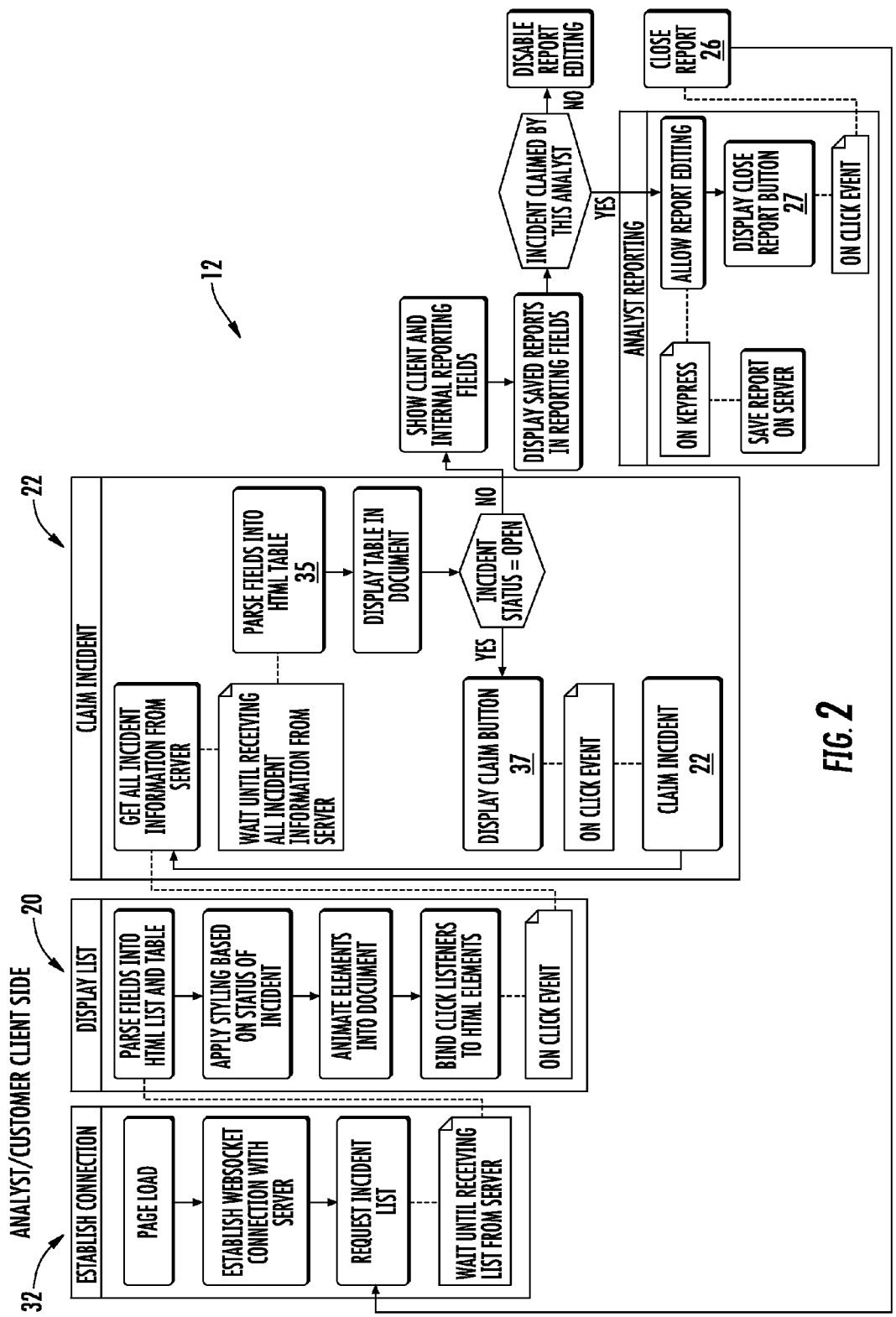
FIG. 2 is a block diagram illustrating functions of a client side of FIG. 1.

After claim incident process flow has finished, the reporting process 24 becomes available to the analyst. Once the reporting process 24 is available, two fields are displayed, one for a client report, and one for internal reporting. Key press event handlers are attached to each field that sends a command to the server to save the modified report. A close report button 27, as illustrated with reference to FIG. 2 is also made visible which when clicked will send a command to the server side 14 closing 26 the completed report. After receiving confirmation from the server side 14, the view is reset and the updated incident list is requested again. A close report functional flow is illustrated with reference again to FIG. 3.

As herein described by way of example for one embodiment, there are two ways that the incident is sorted 36 either by a client-defined filter and/or the list is sorted comparing severity, believability, and the time the incident was discovered. The list is then parsed into a browser-friendly format and sent back to the client for display. When the client requests additional information about an incident, all information known about the incident is retrieved from the database, parsed, and sent back 38 to the client for display. Upon receiving the command to mark an incident as claimed 30, the record is updated in the database 28, and the incident is no longer available to other clients for claiming. The reporting fields associated with the incident are unlocked and the server side 14 sends the client the signal to allow reporting. As the report is filled out on the client side 12, all changes are sent to the server side 14 to be stored to allow multitasking by the analyst. If the incident information is requested again later, the reports are sent along with it to allow analysts to work on multiple incidents at once while preventing data loss. When the client sends the command to close the report 26, the record is marked as closed and is removed from the display 20. The record is no longer available in the standard filter and must be specially requested by an analyst to view any closed report.

Figure 4:
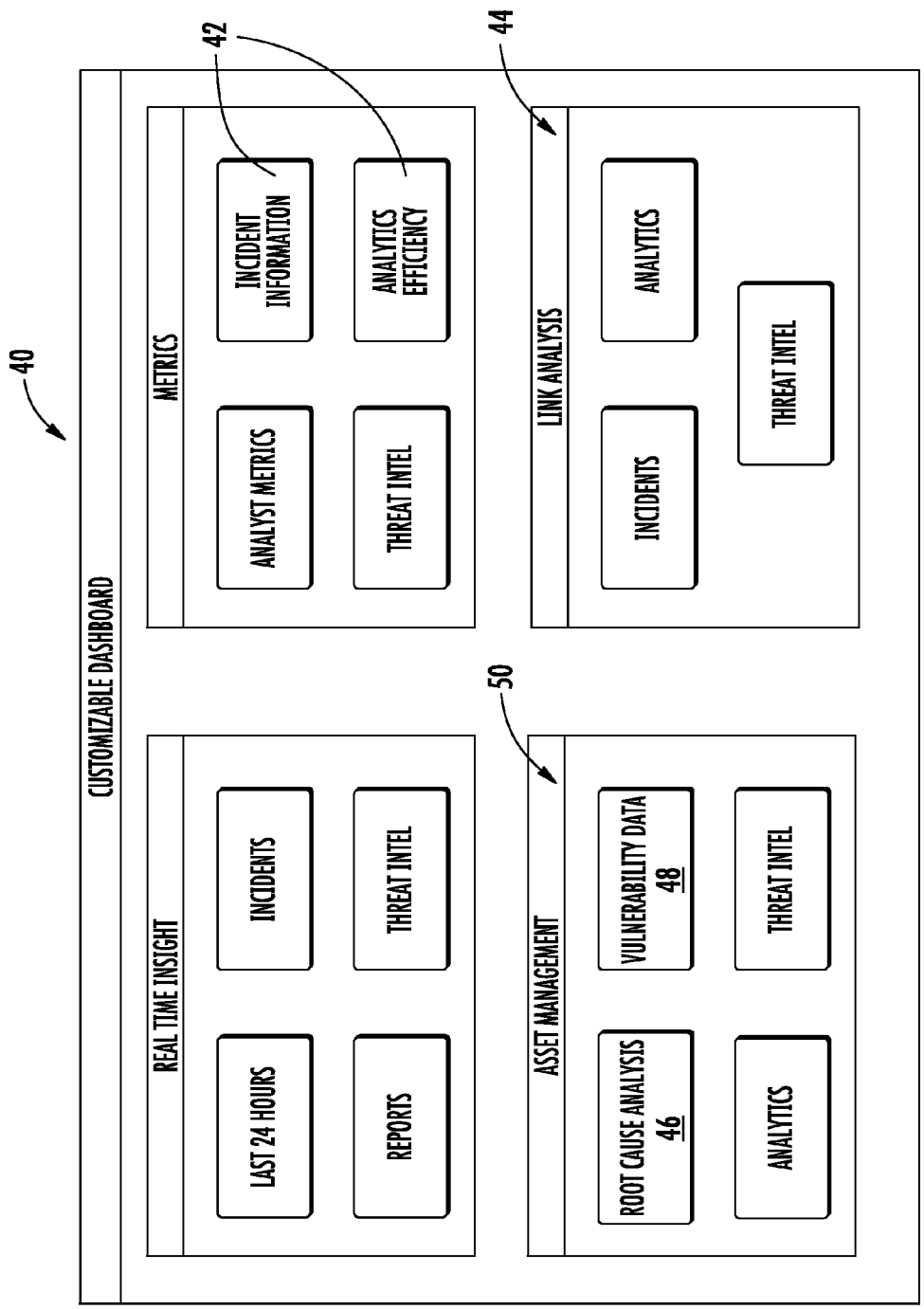
FIG. 4 illustrates a customizable dashboard according to the teachings of the present invention, by way of non-limiting example.

Customizable Views are available. By way of example and with reference to FIG. 4, a Customizable Dashboard 40 is meant to display metrics, statistics, and live insight into a customer's network. Information is displayed through dynamic widgets 42 that can be moved, resized, removed, or added as the customer sees fit, with a persistent layout that is stored for each user via a profile. The widgets 42 serve as an easy entry point for drilldown on incidents; threat Intel, assets, analysts, etc.

Link Analysis 44 is available. Data from analyst reports and information provided by automated analytics is processed, producing a graph showing the links between incidents and other events in the customer's network. Information is displayed as an interactive web, allowing for customer drilldown into the individual events to better analyze the incident.

Further, systems and methods according to the teachings of the present invention provide Root Cause Analysis 46, Vulnerability Data Association 48, and Asset Management 50. The system 10 provides insight into the root cause of the incident that was reported. When the forms are generated for the asset, that asset is assigned a category and associated with vulnerability information input previously by a customer. An analyst that examines the timeline then categorizes the incident or sequences of events, confirmation of exploit or attempted exploit.

An interface allows the customer to import vulnerability data 48 into the customer portal that is stored in the incident database 28, tied to asset management 50. When an incident affects a certain asset, the display page shows a logical mapping of assets across incidents, ranking those per level of criticality. Analysts are then routed via the server side 14 this information per the metrics and routing functionality. A page is dedicated to allowing the customer to manually add asset information regarding types of devices, and associating priority with each respective device. By providing this information, the customer helps tailor the automated response, affecting how incidents are displayed to an analyst by differentiating critical systems from normal devices.

As analysts operate on incidents identified in the customer's environment, statistics are tracked and displayed to the customer. Information like most severe incidents identified, number of false positives, average incidents per day, asset with most number of incidents, etc. are all available, and all act as starting points for drilldown.

Embodiments of the system are built in module sections of code client side 12 and server side 14, which support the architecture of both system analyst dashboard and customer dashboard. By way of non-limiting example only, the tickets and analyst part is known as analyst and the customer dashboard is known as customer.

Figure 3:
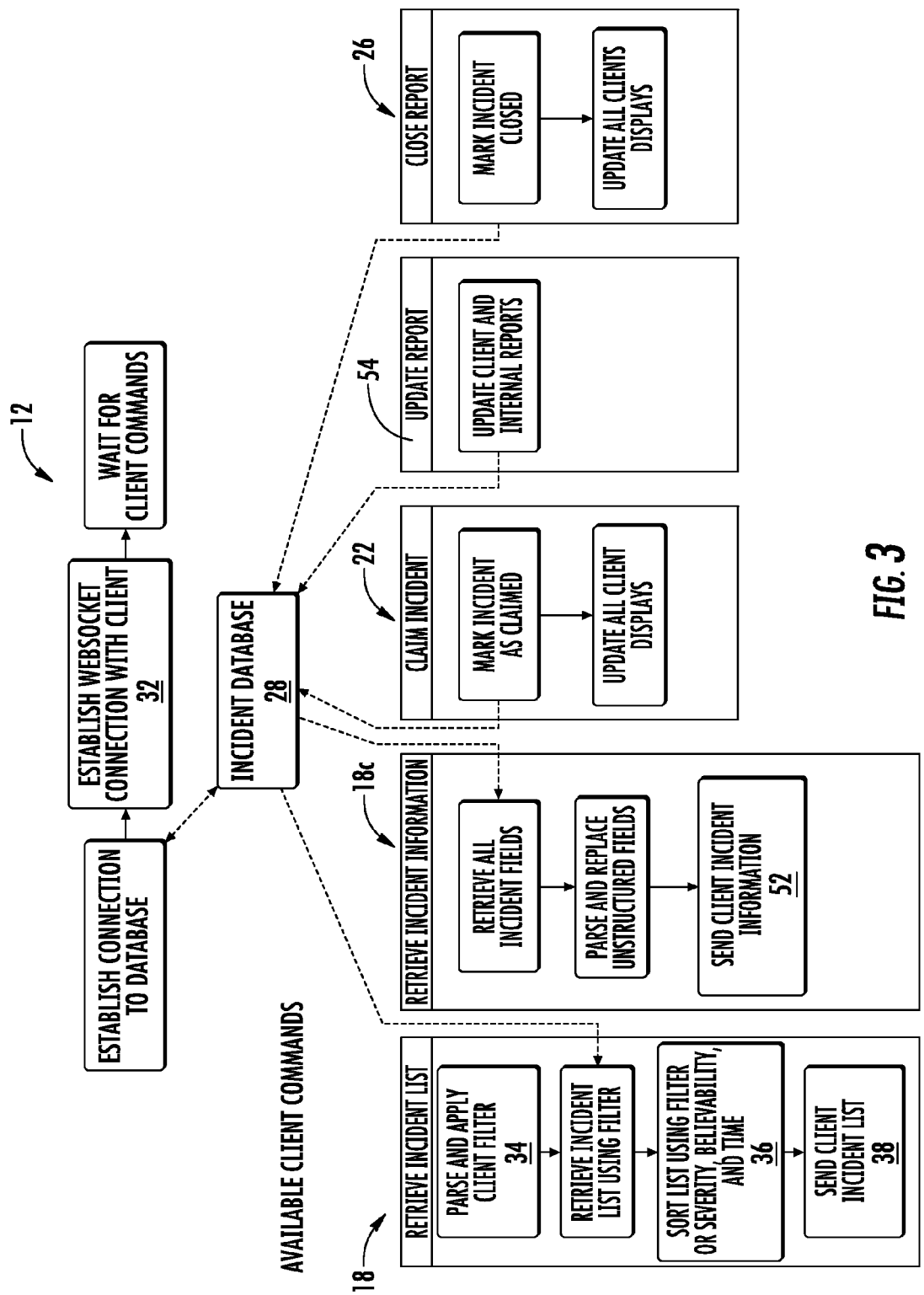
FIG. 3 is a block diagram illustrating available client commands.

In order to provide the efficient sharing of data between analysts and the threat intelligence engine in a security operations center, reference is again made to FIG. 3. As illustrated in FIG. 3 for retrieving an incident list 18c, a specific process flows where information presented to the analysts is controlled by two factors such as client-driven filter 36 profiles about the analyst and the threat intelligence alert which is sorted by performing machine learning and human analysis on comparing the severity, believability, reliability and timing of incident discovery. These factors are weighted to perform averages over determinate periods of time increasing the intelligence about the speed with which analysts are provided with the latest incident based on threat intelligence feeds and automated direct code access to enterprise security devices. The objective of Incident List retrieval 18 functionality is to provide real-time, near instant streaming of incidents to analysts that are ranked in order to provide prioritization through criticality, asset, vulnerability, root-cause, and the like.

The system 10 provides advanced metrics and routing of incident information. Referring again to FIG. 3, block entitled "Send Client Incident List" 38 under the retrieve incident information process flow 18, is where the portal has profiles stored of SOC analysts, measured by key words, years of experience, familiarity with tools, understanding of customer network and assets, etc. The server side 14 engine makes efficient routing changes and collects metrics on analysts so that incidents match not only skill level but also various other degrees of experience in different categories uses these profiles.

While improving efficiency of data analysis, sharing of data, routing of incidents is important and also builds contextual information based on what enterprise device detected the incident and or threat that should be presented to the analyst to triage. In order to provide efficiency and speed to investigative analysis in security operation centers (SOC), the portal provides direct links to the enterprise security devices in the box called "Send Client Incident List " 52 at allows analysts to pivot directly to information that is more detailed than the alert, this allows for what is termed as deep analysis.

Automating common analysis processes on the analyst side of the system 10 is desirable for improving analyst processes. Referring again to FIG. 1, a process flow is illustrated with reference to the client side 12 incident flow for how analysts claim incidents from the client side program. This process flow parses the incident information, presents this to an analyst, which in return opens a flexible web 2.0 based chat session to similar ranked analysts allowing for editing and collaboration across ticket portals. In this routine are various checks to make sure the incident is assigned correctly, given the right priority, that spell check and customer are correct and also provides an administrative review option for junior analysts to senior analysts.

In order to provide an avenue for machine learning algorithms to improve processes, the system utilizes a believability and reliability ranking engine that helps to tailor the incident information the is processed and presented the analyst. Parts of this functionality are illustrated with reference again to FIG. 3 where all "incident fields" are retrieved as the threat intelligence engine has informed the incident database of previous ranking of believability, and reliability. With continued reference to FIG. 3 regarding an update report function 54, the analyst can provide human based input to teach the machine learning algorithm of whether the incident was a false positive, the threat intelligence was not correct, and or the threat has since moved and the threat intelligence data needs to be retired because its finite life period has expired, and the information was not used by threat actors recently, etc.

In order to add in the customer dashboard 40 creation, and the illustration of complex incidents, the system 10 also utilizes cutting edge techniques to allow human analysis to illustrate the scenario that correctly describes the incident routed to the analyst. With reference again to FIG. 1, referencing an analyst reporting, there are a multitude of drop down menus with entities, attack types, scenario language that is used to build from a form based input the entire attack scenario of the incident going as granular as known malware families and or threat actors that are being tracked by the operations centers that attack certain customer bases.

Displaying incident information to clients in an intelligent, comprehensive, collated, efficient, and illustrative way that combines power of root-cause, link analysis, vulnerability and asset information is ever more important to give clients and users the insight into their defensive posture, something that larger, branded, and outdated web portals have tried to do.

Figure 5:
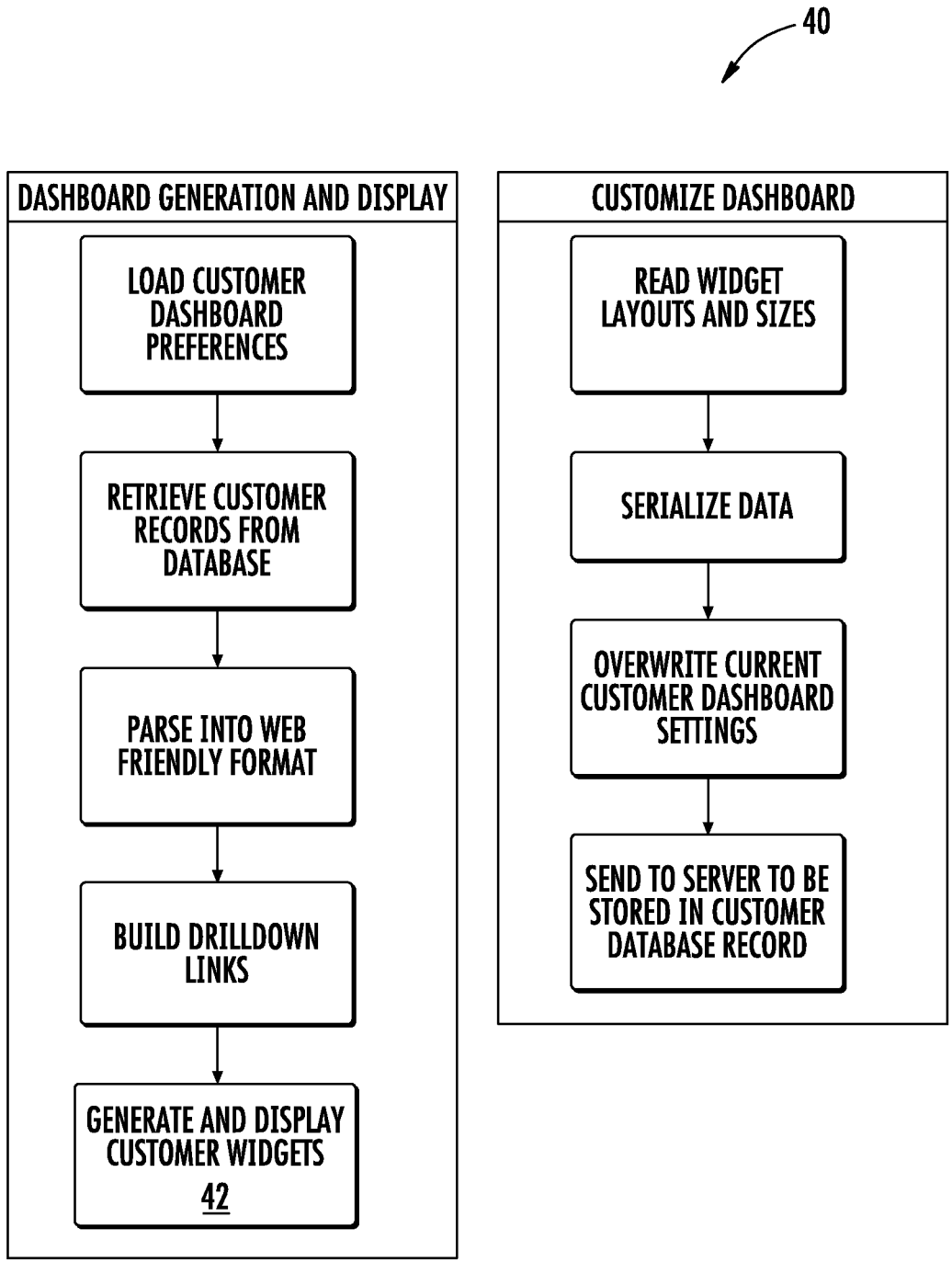
FIG. 5 illustrates dashboard plug and play modules that draw from data points associated within an incident database, analyst inputs and raw intelligence which provide customizable view points and/or mini dashboards, by way of example.

The system 10 starts the display engine with a series of graphical widgets 42 that are event driven consoles, which originate from various data sources. Referring to FIG. 5, there are a series of plug and play modules that draw from data points associated within the incident database, analyst inputs and raw intelligence which provide customizable view points and or mini dashboards such as link analysis in the form of parabolic graphs, geo-location view points, threat intelligence highlighted view points, etc. These modules are not selected all at once by the customer view point but are rather a menu of options that allow over 75 different customizations for preparation of data fed from incident ticketing, analysis, human analysis, threat intelligence, open source intelligence gathering, and "darknet" searching providing trademark, company, brand protection trends as related to OSIM (open source intelligence methodology) employed by analysts and automated resources.

The system 10 also provides a cutting edge presentation layer built around link analysis theory. Reference again to FIG. 5 illustrates that the data points from an incident, wherein all entities involved are given graphical characters, are put in a sequence that allow full visual playback for the incident. These data links are graphical characters that hold menu links allowing further drilldown by said customer into computer specific log files, screen captures, analyst notes.

The system 10 stores large amounts of what is termed "surrounding data", wherein surrounding data are data about an organizations enterprise including assets, network names, host names, vulnerability data associated with the assets. FIG. 6 illustrates the asset management 50 functionality of the system, in which the surrounding data is are organized and associated to assets in order to provide the drill down features of link analysis in FIG. 5. The system 10 has a flexible parsing engine allowing upload of asset lists in industry standard formats and populates this into the incident database. Vulnerability data about particular assets are linked directly to those assets in the incident database. Presentation of these data is a sub-routine handled by link analysis in FIG. 5 where the "surrounding data" is retrieved. The system 10 takes analyst input, illustrated with reference again to FIG. 1, and allows analysts to report on a root cause of the incident. This root cause is associated with the vulnerability data inside the incident database adding to the "surrounding data" collected and or inputted into the system.

In order to gather metrics on large teams of analysts, the system 10 includes a metrics engine 56, illustrated by way of example in FIG. 7 titled "Calculate requested metrics across all sets of records". This calculation allows large teams of analysts to be ranked on various attributes from close of incidents, what type of incidents handled over period of time, level of incident handled on daily or weekly basis. FIG. 7 allows for collection of metrics that help feed the decision-making processes involved in the routing engine referred to in FIG. 3.

Figure 8:
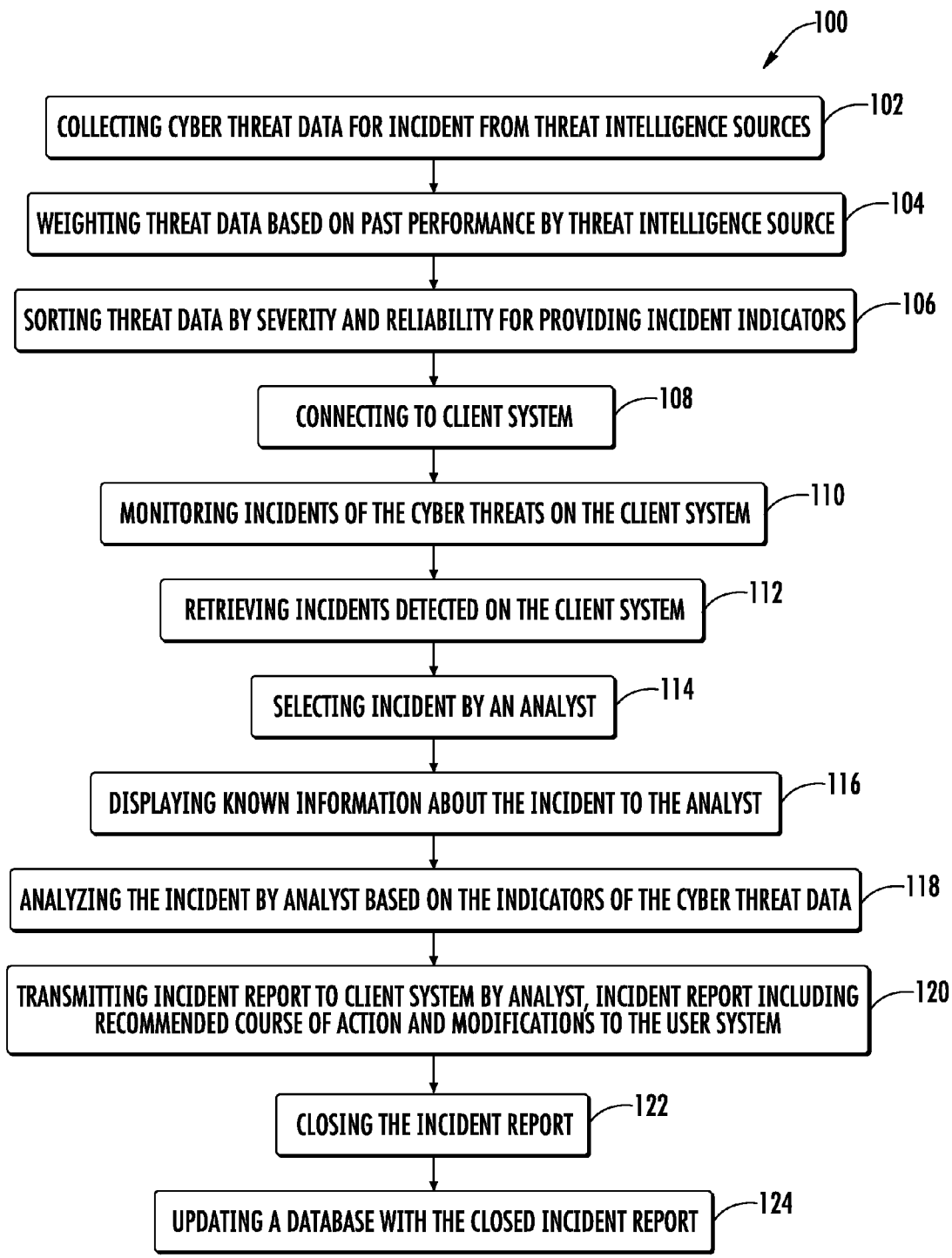
FIG. 8 is a flow chart illustrating one computer-implemented method for detecting and reporting an internet threat according to the teachings of the present invention.

By way of further example and with reference to FIG. 8, one method aspect of the invention may include a computer-implemented method 100 for detecting and reporting an internet threat. The method 100 may comprise collecting a plurality of cyber threat data 102 for an incident from a plurality of threat intelligence sources; weighting the cyber threat data 104 based on past performance by the threat intelligence source providing the data; sorting the cyber threat data 104 by severity and reliability for providing indicators for the incident; connecting to a client system; monitoring incidents 110 of the cyber threats on the client system; retrieving incidents 112 detected on the client system; selecting 114 at least one incident by an analyst; displaying 116 known information about the at least one incident to the analyst; analyzing 118 the incident by the analyst based on the indicators of the cyber threat data; transmitting 120 an incident report to the client system by the analyst, wherein the incident report includes a recommended course of action and modification to the user system; closing 122 the incident report; and updating 124 a database with the closed incident report.

Flowcharts and block diagrams herein described illustrate architecture, functionality, and operation of possible implementations of systems, methods and computer program products according to various embodiments. Therefore, it will be understood by those of skill in the art that each block in the flowchart or block diagram may represent a module, segment, or portion of code, which comprises one or more executable computer program instructions for implementing the specified logical function or functions. Further, some implementations may include the functions in the blocks occurring out of the order herein presented. By way of non-limiting example, two blocks shown in succession may be executed substantially concurrently, or the blocks may at times be executed in the reverse order, depending upon the functionality involved. It will also be noted that each block of the block diagrams and flowcharts, and combinations of blocks in the block diagram and flowchart illustrations, may be implemented by special purpose hardware-based systems that perform the specified functions or acts, or combinations of special purpose hardware and computer instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects of various embodiments may be embodied as a system, method or computer program product, and accordingly may take the form of an entirely hardware embodiment, an entirely software embodiment (including firmware, resident software, micro-code, and the like) or an embodiment combining software and hardware aspects that may all generally be referred to herein as a circuit, module or system. Furthermore, aspects of various embodiments may take the form of a computer program product embodied in one or more computer readable media having computer readable program code embodied thereon. It is understood that the computer implemented method herein described operates with readable media relating to non-transitory media, wherein the non-transitory computer-readable media comprise all computer-readable media, with the sole exception being a transitory, propagating signal.

Any combination of one or more computer readable media may be utilized. A computer readable medium may be a computer readable signal medium or a computer readable storage medium. A computer readable storage medium may be, by way of non-limiting example, an electronic, magnetic, optical, electromagnetic, infrared, or semiconductor system, apparatus, or device, or any suitable combination of the foregoing. More specific non-limiting examples of the computer readable storage medium may include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, by way of non-limiting example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, and the like, or any suitable combination thereof. Computer program code for carrying out operations for aspects of various embodiments may be written in any combination of one or more programming languages, including an object oriented programming language such as Java, Smalltalk, C++ or the like and conventional procedural programming languages, such as the C programming language or similar programming languages. The program code may also be written in a specialized language. The program code may execute entirely on the user's computer, partly on the user's computer, as a stand-alone software package, partly on the user's computer and partly on a remote computer, or entirely on the remote computer or server. The remote computer may be connected to the user's computer through any type of network, including a local area network (LAN) or a wide area network (WAN), or the connection may be made to an external computer (by way of non-limiting example, through the Internet using an Internet Service Provider).

Although the invention has been described relative to various selected embodiments herein presented by way of example, there are numerous variations and modifications that will be readily apparent to those skilled in the art in light of the above teachings. It is therefore to be understood that, within the scope of the claims supported by this specification, the invention may be practiced other than as specifically described.

That which is claimed is:

1. A computer-implemented method for detecting and reporting an internet cyber threat, the method performed using one or more computer processors, the method comprising:
   connecting to a client system;
   monitoring cyber threat incidents on the client system;
   collecting cyber threat data for the cyber threat incidents, the cyber threat data from a plurality of threat intelligence sources;
   weighting the cyber threat data based on past performance by the threat intelligence source of the plurality of threat intelligence sources providing the cyber threat data;
   sorting the cyber threat data based on the weight;
   storing the sorted cyber threat data in an incident database;
   producing an incident list including cyber threat incidents on the client system, the incident list including unclaimed cyber threat incidents in the incident database that include characteristics that match a nuniber of years of experience, understanding of the client system, and familiarity with analyst tools of an analyst as identified in an analyst profile stored in the incident database, the incident list including cyber threat incidents prioritized based on severity and time, with the most severe and most urgent cyber threat incident that matches the analyst profile with a highest priority;
   selecting the highest priority cyber threat incident in the incident list for analysis by the analyst;
   retrieving cyber threat data regarding the highest priority incident from the incident database;
   displaying the sorted cyber threat data about the at least one incident to the analyst;
   receiving a recommended course action and modification to the client system by the analyst based on the sorted cyber threat data;
   transmitting an incident report to the client system, wherein the incident report includes a recommended course of action and recommended modification to the client system;
   closing the incident report; and updating the incident database with the closed incident report.

2. The computer-implemented method according to claim 1, wherein the client system connecting comprises opening a connection to a server by a client through authentication of the client for establishing a socket connection with the server.

3. The computer-implemented method according to claim 1, wherein the cyber threat data is synced across client and server for providing the list of incidents to the client.

4. The computer-implemented method according to claim 3, wherein selecting the highest priority cyber threat incident results in known information about the incident provided as an array of objects sufficient for differentiating the one incident from another incident.

5. A computer-implemented method for reporting a cyber threat, the method comprising:
    establishing, by a client side, a connection to a server side;
    requesting, using one or more processors of the client side, a list of incidents from an incident database on the server side;
    retrieving the list of incidents from the incident database;
    displaying, by the client side, the incident list including cyber threat incidents on the client side, the incident list including unclaimed cyber threat incidents in the incident database that include characteristics that match a number of years of experience, understanding of the client system, the closing of incidents, type of incidents handled over a period of time, a level of incident handled on daily or weekly basis, and familiarity with analyst tools of an analyst as identified in an analyst profile stored in the incident database, the incident list including cyber threat incidents prioritized based on a plurality of factors including severity of the incident and time the incident was discovered, with the most severe and most urgent cyber threat incident that matches the analyst profile with a highest priority, wherein the list of incidents includes information about each incident within the list of incidents;
    selecting the highest priority incident by an analyst operating on the client side;
    retrieving data regarding the highest priority incident from the incident database;
    displaying, by the client side, the information about the highest priority incident to the analyst;
    displaying reporting fields for customer use to the analyst;
    receiving input from the analyst for the repotting fields including a recommended course of action and modification to the client system;
    transmitting an incident report to a client system on the client side, wherein the incident report includes the recommended course of action and the recommended modification to the client system;
    closing the highest priority incident after receiving the input; and
    updating the incident database with the received input after closing the report.

6. The computer-implemented method according to claim 5, further comprising providing internal reporting for the customer following closing the report.

7. The computer-implemented method according to claim 5, wherein the connection establishing step comprises:
    authenticating the client side connection;
    establishing a socket connection with the server side; and
    synchronizing data transfer across the client and the server sides.

8. The computer-implemented method according to claim 5, wherein the client side receives the list of incidents as an array of objects, and wherein only the objects used by the analyst are instantiated.

9. The computer-implemented method according to claim 5, wherein each item in the list of incidents represents one incident with several key fields for allowing the analyst to quickly differentiate one incident from another incident.

10. The computer-implemented method according to claim 5, wherein each incident in the list of incidents is parsed into an HTML list item and table row and given a class to differentiate open incidents from claimed ones.

11. The computer-implemented method according to claim 5, wherein the list of incidents is animated into a document for interaction with the analyst.

12. The computer-implemented method according to claim 5, wherein the at least one incident closing is followed by providing data from the server side returned as a dictionary of key value pairs, and wherein each pair represents one field and its respective value about the incident.

13. The computer-implemented method according to claim 12, further comprising parsing the pairs into table cells and displaying the table cells, wherein if the incident had already been claimed by another analyst, no other options are made available beyond viewing the information about the incident as well as which analyst prepared the report.

14. The computer-implemented method according to claim 5, further comprising, in response to selecting the highest priority incident by an analyst operating on the client side, marking the selected incident by the analyst as claimed so as to allow the reporting process to become available.

15. The computer-implemented method according to claim 14, wherein the reporting comprises displaying a client report and an internal report responsive to the reporting becoming available.

16. The computer-implemented method according to claim 5, wherein the list of incidents is sorted by factors including at least one of sorting by a client-defined filter including importance of equipment involved in the incident.

17. The computer-implemented method according to claim 16, wherein the factors are weighted to perform averages over determinate periods of time increasing the intelligence about the speed with which analysts are provided with updated incident information based on threat intelligence feeds and automated direct code access to enterprise security devices.

18. The computer-implemented method according to claim 5, further providing a link analysis, wherein data from the analyst reporting and information provided by automated analytics is processed, producing a graph showing the links between the incidents, and wherein information is displayed as an interactive web, allowing for customer drilldown into individual events to analyze the incident.

19. The computer-implemented method according to claim 5, manually adding asset information by a customer regarding types of devices used in a customer network on the client side, and associating a priority with each device for tailoring an automated response, and affecting the displaying of the incidents to an analyst by differentiating critical devices from normal devices, and wherein the displaying includes a logical mapping of assets across incidents and a ranking per level of criticality for routing to the analyst via the server side, and linking vulnerability data about a particular asset to related assets in the incident database.

20. The computer-implemented method according to claim 5, wherein the routing of the incidents results in building contextual information based on what enterprise device detected the incident, and identifying the enterprise device to the analyst for triage.

21. The computer-implemented method according to claim 5, further comprising using machine learning algorithms operable with the server side to improve processes by using a believability and reliability ranking engine to tailor the incident information that is processed and presented to the analyst and retrieving incident fields as a threat intelligence engine for informing the incident database of a previous ranking of believability, and reliability.

22. The computer-implemented method according to claim 21, further comprising the analyst providing human based input to teach the machine learning algorithm at least one of the incident was a false positive, the threat intelligence was not correct, the threat has since moved, the threat intelligence data needs to be retired because its finite life period has expired, and the information was not used by analysts over a preselected time period, and reporting most severe incidents identified, number of false positives, average incidents per day, and asset with most number of incidents to the client side.

23. The computer-implemented method according to claim 5, further comprising storing surrounding data in the incidents database, the surrounding data including information about an enterprise of an organization including assets, network names, host names, vulnerability data associated with the assets.

24. The computer-implemented method according to claim 23, further comprising reporting a root cause of the incident, wherein the root cause is associated with vulnerability data inside the incident database.

\* \* \* \* \*